Nov. 14, 1950     R. M. HANSON     2,529,729
MEANS FOR MAINTAINING ACCURACY OF PRECISION AMMETERS
Filed Feb. 18, 1946

Inventor
Roy M. Hanson
By Philip A. Friedel
Attorney

Patented Nov. 14, 1950

2,529,729

UNITED STATES PATENT OFFICE 2,529,729

MEANS FOR MAINTAINING ACCURACY OF PRECISION AMMETERS

Roy M. Hanson, Oakland, Calif.

Application February 18, 1946, Serial No. 648,451

2 Claims. (Cl. 171—95)

1

This invention, a method of, and means for maintaining accuracy of precision ammeters consists of a method and means for protecting an ammeter against shocks due to initial power load surges and also when desired, against overloads.

Precision ammeters are very delicately constructed, with extremely light weight needles, springs, delicate pivots and jewel pivot bearings, and if protected against shock and overload, will maintain their accuracy almost indefinitely, but any initial load surge may throw the needle over so violently as to cause it to be sprung or bent, and/or the pivots bent, dulled, or broken, or jewels marred, or the hair spring broken, and with overloads the same damage may occur in addition to probable burning out of the inductive windings or damaging them. The damage in any case may be so slight as to be undetectable except when the ammeter is re-checked for accuracy. For instance the damage to a pivot or bearing may be so slight as to be invisible, yet sufficient to definitely affect the accuracy of the instrument.

Because of lack of protection, other than a damper, no precision ammeter can be relied upon for accuracy after it has been subjected to a heavy load surge or overload, and it is the purpose of my invention to provide this protection so that the instrument cannot be damaged by such causes. A damper merely functions as a retarder for the needle, and its retarding effect is not sufficient to prevent shock with a heavy initial surge and is ineffective with overloads.

My invention virtually cuts the instrument out of circuit under no load, retains it in that condition during an initial surge, and restores its function when the initial load surge has passed. If the line is subjected to a heavy overload, beyond the capacity of the ammeter, the ammeter is similarly made substantially inactive until the overload period has passed, when the ammeter is again restored.

The objects and advantages of the invention are as follows:

First, to provide a method of maintaining the accuracy of a precision ammeter.

Second, to provide a method of maintaining the accuracy of a precision ammeter in which the ammeter is protected against shocks due to initial load surges or overloads.

Third, to provide a method of preventing sudden surge loads or sudden or prolonged overloads from damaging the constituent elements of an ammeter to thereby insure maintenance of accuracy.

2

Fourth, to provide means for decreasing or eliminating the function of an ammeter during the initial load surge upon completion of a circuit, and thereafter restore the function.

Fifth, to provide means as outlined which can be incorporated within an ammeter assembly or installed as an auxiliary, at will.

Sixth, to provide means as outlined which can be connected in circuit externally of an existent ammeter or included within the ammeter casing.

In describing the invention reference will be made to the accompanying drawings, in which.

Figure 1:
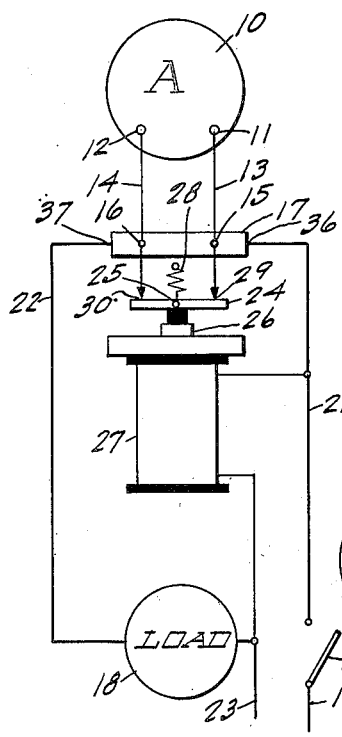
Fig. 1 is a wiring diagram showing the invention as consisting of a parallel shunt connectable and disconnectable in the main circuit to increase the conductance differential between the main line and the ammeter.
Figure 3:
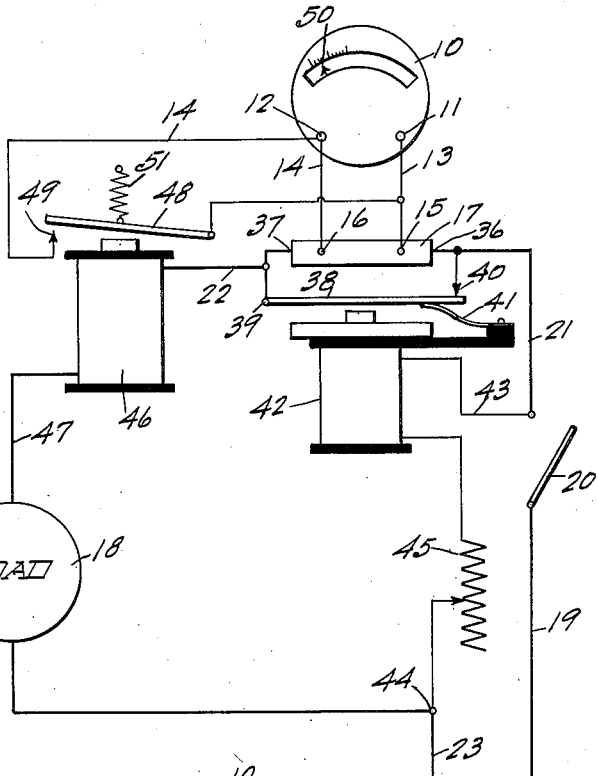
Fig. 3 is a complete diagram of the invention including protection against initial load surges and against overload, and including voltage control means for the actuating means.
Figure 2:
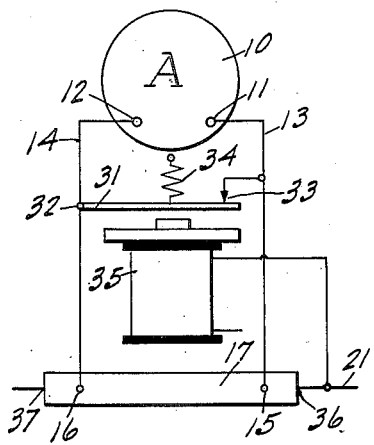
Fig. 2 shows the invention as consisting of a shunt connectable across the terminals of the ammeter for shunting the ammeter circuit and thus reducing its function to substantially nil.
Figure 4:
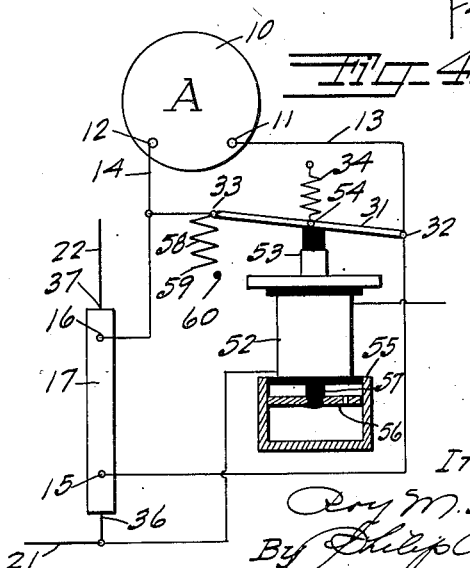
Fig. 4 is another modification in which the ammeter is controlled through a combination of shunt and resistance to slowly restore the function of the ammeter.

When the ammeter is not subject to any loads in excess of the indicated capacity, and only subject to initial load surges, and designed and adjusted for the specific voltage with which it is to be used, the preferred forms of the invention are those illustrated in Figs. 1, 2, and 4 while if the ammeter is to be used with different voltages, in addition to the conventional shunt adjustment, a variable resistor is shunted across the terminals of the actuating coil for the differential changing means as indicated in Fig. 3, and if the ammeter is subjected to overloads beyond the indicating capacity of the dial, the arrangement in Fig. 3 is preferable, with or without the resistor and with either of the shunting means illustrated in the several figures, providing complete protection against initial load surges and overloads, and thereby maintaining the accuracy of the ammeter over an extended and indefinite period. This invention in no way interferes with the conventional needle swing damper and can be used with or without the damper which in no way affects the operation of the invention.

Referring to Fig. 1, the ammeter 10 includes a needle and electromagnetic deflecting mechanism of any conventional type having terminals 11 and 12 connected through leads 13 and 14 to points 15 and 16 on the shunt 17 which is conventionally installed within the ammeter case.

The load 18 is connected to one side 19 of the power line through a switch 20, conductor 21, shunt 17, conductor 22, load 18, and conductor to the other side 23 of the power line.

The invention consists in selectively double shunting the ammeter while maintaining a fixed circuit so that performance of the ammeter will not be affected by any type of circuit-breaking devices; the ammeter circuit being continuously complete.

This double or auxiliary shunting is established when the main circuit is broken—when the load is not in operation; and where protection is provided against overloads, it is established when the overload occurs and maintained as long as the overload exists.

In its simplest forms the invention consists of a second shunt which may be in parallel with the standard shunt or across the ammeter terminals between the needle deflecting mechanism and the main shunt. If in parallel with the standard shunt, the conductance of the auxiliary shunt should be at least equal to that of the standard, but if connected across the ammeter leads, it need have no greater conductance than the leads between the shunt and the needle actuating coils, though a shunt of higher conductivity will more effectively rob the ammeter of actuating current.

The auxiliary type of selective main line shunt is illustrated in Figs. 1 and 3, while the selective ammeter shunt is illustrated in Figs. 2 and 4.

Referring to Fig. 1, an auxiliary shunt 24 which is pivoted at 25 for slight equalization requirements to the core 26 of the delayed-action electro-magnet 27 of the solenoid type, is normally maintained in circuit parallel with the standard shunt 17 through urgence of the spring 28 which maintains contacts at 29 and 30. The contacts may be of any suitable type such as the sequential make and break multiple spring-finger type or a wipe or wedge contact.

With this arrangement, when the switch 20 is open, the shunt 24 is in circuit parallel with the main shunt 17. When the switch is closed, the flow of current to the ammeter is cut to one-half or less of normal so that the initial power surge on closing the switch is carried through the twin shunts with the ammeter only slightly actuated. Following the time-delay period of the magnet, the auxiliary shunt is disconnected from the circuit and retained out of circuit until the switch is again opened, thus returning the ammeter to normal operation as soon as the initial surge has been dissipated.

In Fig. 2, a shunt 31 is pivoted at 32 to one side 12 of the ammeter and is normally maintained in contact with the other side 11 as indicated at 33 by a spring 34, thus shunting the actuating coils within the ammeter. A delayed action electro-magnet 35 is actuated on closing the switch 20 in the main power line 21 following the time delay period, breaking contact at 33 to restore the ammeter to service. In this case, if the shunt 31 has considerably higher conductance than the leads 13 and 14, the short-circuiting of the ammeter will be substantially complete when the contact is made at 33. The type shown in Fig. 1 is best adapted to existent or installed ammeters because the invention can be connected across the terminals on the ammeter case, which correspond to the connections 36 and 37 on the shunt, while that shown in Fig. 2 provides a more compact arrangement for installation within the case.

The arrangement illustrated in Fig. 3 covers both, initial surges and overloads and may be arranged in either, the parallel shunt type or the ammeter-shunting type, and is shown with the latter arrangement, in which the auxiliary shunt 38 is pivotally or flexibly connected to the standard shunt 17 as indicated at 39 and closes to a contact 40 through the urgence of a spring 41. A delayed-action electro-magnet 42 is connected across the power line as indicated at 43 and 44, to be energized only when the switch 20 is closed. If the ammeter is intended to handle only one voltage, the variable resistor is omitted, since the magnet can be wound to suit, otherwise a suitable variable resistor 45 is placed in circuit to control the input to the windings to suit the specific voltage.

The overload control consists of a current electro-magnet 46 which is connected in series with the load through the conductors 22 and 47, and this electro-magnet closes the shunt 48 to the contact 49 when the amperage passing through the magnet coil rises above a predetermined value, closing the shunt across the terminals 11 and 12 of the ammeter, thus decreasing the deflection of the needle 50 or making it inoperative, depending on the relative conductance of the shunt 48 and its leads. This circuit is normally interrupted through the urgence of the spring 51.

With this arrangement, when the switch 20 is open the auxiliary shunt 38 is closed at 40 thus reducing the current available for operation of the ammeter, with the ammeter reading about half-deflection when both shunts have the same conductance. Shunt 48 is open as indicated at 49. When the switch 20 is closed, there is a power surge of great intensity through the circuit, but the shunt 38 greatly depresses the deflection of the needle of the ammeter, or, when the ammeter circuit shorting shunt illustrated in Figs. 2 and 4 is used with a shunt of relatively high conductance, almost complete absence of deflection results, and following the time-elapse interval of the electro-magnet, the contact at 40 is broken and the ammeter returns to normal operation.

If either with the initial power surge, or at any time thereafter, there should be a load sufficient to carry the needle past its highest indication, the electro-magnet 46 will close the shunt 48 to contact 49 to make the ammeter inoperative or substantially so, the current magnet 46 being designed to operate to close the shunt when the current in the main line to the load reaches a predetermined value, and to free the shunt to open when the load again drops below that predetermined value.

In Fig. 4 is shown an arrangement which slowly switches the ammeter in circuit after the initial surge, and consists of an armature 31 which is flexibly or pivotally connected to one terminal of the ammeter as indicated at 32, and normally in contact with the other terminal as indicated at 33, and urged to contact by a spring 34.

In this case a delayed action solenoid 52 has its core 53 pivotally connected to the shunt as indicated at 54, and a dashpot 55 having a piston 56 operatively connected to the core 53 as indicated at 57 greatly retards the movement of the core following the time-delay period of the solenoid, so that the movement is slow. During this movement, the main contact is broken at 33, but this contact forms one terminal for the resistor 58 with the terminal 59 being open, and with a mere stop for the shunt being provided at 60.

With this arrangement the ammeter is normally shorted out. When the switch 20 is closed there is a surge through the line but this surge has little or no effect on the ammeter. If the ammeter should be suddenly cut into circuit, the deflection of the needle would be relatively rapid if no damper was included, so that this arrangement is particularly suited to simultaneously function as a damper, since with the slow movement of the solenoid and shunt, with the shunt gradually increasing its resistance and consequently lowering its conductance as it passes over the resistor, the ammeter is slowly brought into operation and no rapid deflection of the needle can occur.

This invention in any of its forms can be applied to any ammeter already installed, since the invention can be installed either externally or within the ammeter case. With the arrangement shown in Figs. 1 and 3, the invention can be connected directly to the ammeter case terminals which are the terminals for the main shunt, as distinguished from the ammeter terminals which are those of the needle actuating means and to which the reference numerals 11 and 12 refer, the actual casing terminals being 36 and 37.

With this invention installed, there can be no violent swing of the needle with the initial load surge because at the time of the surge the ammeter is in an inoperative circuit, therefore the needle cannot become sprung or bent, the pivots cannot become broken or damaged, and there can be no scratching or marring of the jewels or pivot seats. The invention can be used with or without the conventional damper so that no changes are necessary in the ammeter.

Overloads cannot damage the needle or its bearings, coils, or other operating mechanism since as soon as an overload occurs, the ammeter is thrown out of commission instantly and remains so until the overload condition has passed.

Thus the invention will insure indefinitely prolonged accuracy and eliminate the need for frequent calibrations and checks of ammeters, and cannot become damaged through power surges or overloads.

I claim:

1. Means for maintaining the accuracy of an ammeter against initial surges and overloads comprising; a main circuit including a main line switch and a main line shunt and a load; an ammeter biased across said main line shunt, a normally closed auxiliary shunt biased across said main line shunt; an electro-magnetic normally open short circuiting switch connected across said ammeter with the electromagnet in series circuit from one side of said main circuit through said main line shunt and auxiliary shunt in parallel and through the load to the other side of the main circuit to short out the ammeter under excessive loads of extended durations; a time-delay electromagnet for opening said auxiliary shunt for initial surge following a brief time delay period after closing the main line switch and connected across the main circuit to one side of the main and auxiliary shunts, and to the other side of the main circuit, whereby, when the main line switch is closed, the current flows through the main line shunt and auxiliary shunt in parallel to decrease the current flow through the ammeter, with the time-delay electromagnet opening the auxiliary shunt following the initial surge of current.

2. Means for protecting an ammeter against initial surges and overloads, comprising; a main circuit including a circuit closing switch; a load circuit including a load, an overload relay having an overload armature, and a main shunt and an initial surge shunt in parallel; an ammeter connected across said main shunt with said overload armature comprising a normally open switch connected across said ammeter and closed by said overload relay during an overload to short out the ammeter; a delayed action electromagnet connected across said load circuit to bias said load, overload relay and shunts in parallel with said initial surge shunt comprising a normally closed switch normally connecting the shunts in parallel to increase the conductance of the circuit and dampen the ammeter and simultaneously functioning as the armature for said delayed action electromagnet and being opened thereby following the delayed action period of said electromagnet after the circuit closing switch has been closed to reduce the conductance of the circuit to normal and restore the ammeter to normal operation and under control by said overload relay.

ROY M. HANSON.

REFERENCES CITED

The following references are of record in the file of this patent:

UNITED STATES PATENTS

| Number | Name | Date |
|---|---|---|
| 1,188,593 | Wild | June 27, 1916 |
| 1,506,792 | Terry | Sept. 2, 1924 |
| 1,922,792 | Cain | Aug. 15, 1933 |
| 2,325,179 | Doering | July 27, 1943 |

FOREIGN PATENTS

| Number | Country | Date |
|---|---|---|
| 432,366 | Germany | Oct. 30, 1923 |
| 406,360 | Great Britain | Feb. 26, 1934 |